(12) United States Patent
Mizutani (10) Patent No.: US 8,390,738 B2
(45) Date of Patent: Mar. 5, 2013

(54) VIDEO APPARATUS AND METHOD OF MEASURING JITTER/WANDER

(75) Inventor: Tomoji Mizutani, Kanagawa (JP)

(73) Assignee: Sony Corporation, Tokyo (JP)

( * ) Notice: Subject to any disclaimer, the term of this patent is extended or adjusted under 35 U.S.C. 154(b) by 1303 days.

(21) Appl. No.: 12/001,384

(22) Filed: Dec. 11, 2007

(65) Prior Publication Data

US 2008/0143874 A1    Jun. 19, 2008

(30) Foreign Application Priority Data

Dec. 13, 2006    (JP) .............................. P2006-336082

(51) Int. Cl.
*H04N 9/475*    (2006.01)
*H04N 5/04*    (2006.01)

(52) U.S. Cl. ........................................ 348/510; 348/550

(58) Field of Classification Search .................. 348/510, 348/550

See application file for complete search history.

(56) References Cited

U.S. PATENT DOCUMENTS

| | | | | |
|---|---|---|---|---|
| 5,701,262 A | * | 12/1997 | Lee et al. ....................... | 708/322 |
| RE37,761 E | * | 6/2002 | Back .............................. | 348/563 |
| 6,477,185 B1 | * | 11/2002 | Komi et al. .................... | 370/536 |
| 6,480,471 B1 | * | 11/2002 | VanZante et al. .............. | 370/252 |
| 6,928,528 B1 | * | 8/2005 | Hewitt ............................ | 711/156 |
| 7,756,233 B2 | * | 7/2010 | Inoue et al. .................... | 375/356 |
| 7,849,370 B2 | * | 12/2010 | Moshe et al. .................. | 714/700 |
| 2004/0234233 A1 | * | 11/2004 | Jesuk .............................. | 386/13 |
| 2006/0262686 A1 | * | 11/2006 | Wu ............................. | 369/53.11 |

FOREIGN PATENT DOCUMENTS

| | | |
|---|---|---|
| JP | 2003 32212 | 1/2003 |
| JP | 2005-210212 | 8/2005 |
| JP | 2006-319791 | 11/2006 |

* cited by examiner

*Primary Examiner* — Pankaj Kumar
*Assistant Examiner* — Franklin Andramuno
(74) *Attorney, Agent, or Firm* — Frommer Lawrence & Haug LLP; William S. Frommer (57) ABSTRACT

A video apparatus for processing an input video signal in synchronization with an external reference signal is provided. The video apparatus includes a phase compensation FIFO memory and a measuring device. The phase compensation FIFO memory is configured such that the input video signal is written in synchronization with a clock demodulated from the input video signal and the video signal is read in synchronization with an internal reference clock of the apparatus generated from the external reference signal. The measuring device is configured to measure an amount of jitter/wander of the input video signal based on a calculation of a difference between data volume of the video signal obtained in the FIFO memory and a predetermined reference volume.

9 Claims, 5 Drawing Sheets

| Measurement Result | Value of Y | Jitter Amount |
|---|---|---|
| 0000 | 0 or 1 | None |
| 0001 | 2 | Small |
| 0011 | 3 | Allowable Maximum Limit |
| 0111 | 4 | Excessive Countermeasure Required |
| 1111 | 5 or 6 | Noise Generated on Image |

VIDEO APPARATUS AND METHOD OF MEASURING JITTER/WANDER

CROSS REFERENCES TO RELATED APPLICATIONS

The present invention contains subject matter related to Japanese Patent Application JP 2006-336082 filed in the Japanese Patent Office on Dec. 13, 2006, the entire contents of which being incorporated herein by reference.

BACKGROUND OF THE INVENTION

1. Field of the Invention

The present invention relates to a method of measuring jitter/wander in a video apparatus for processing an input video signal in synchronization with an external reference signal.

2. Description of the Related Art

Figure 1:
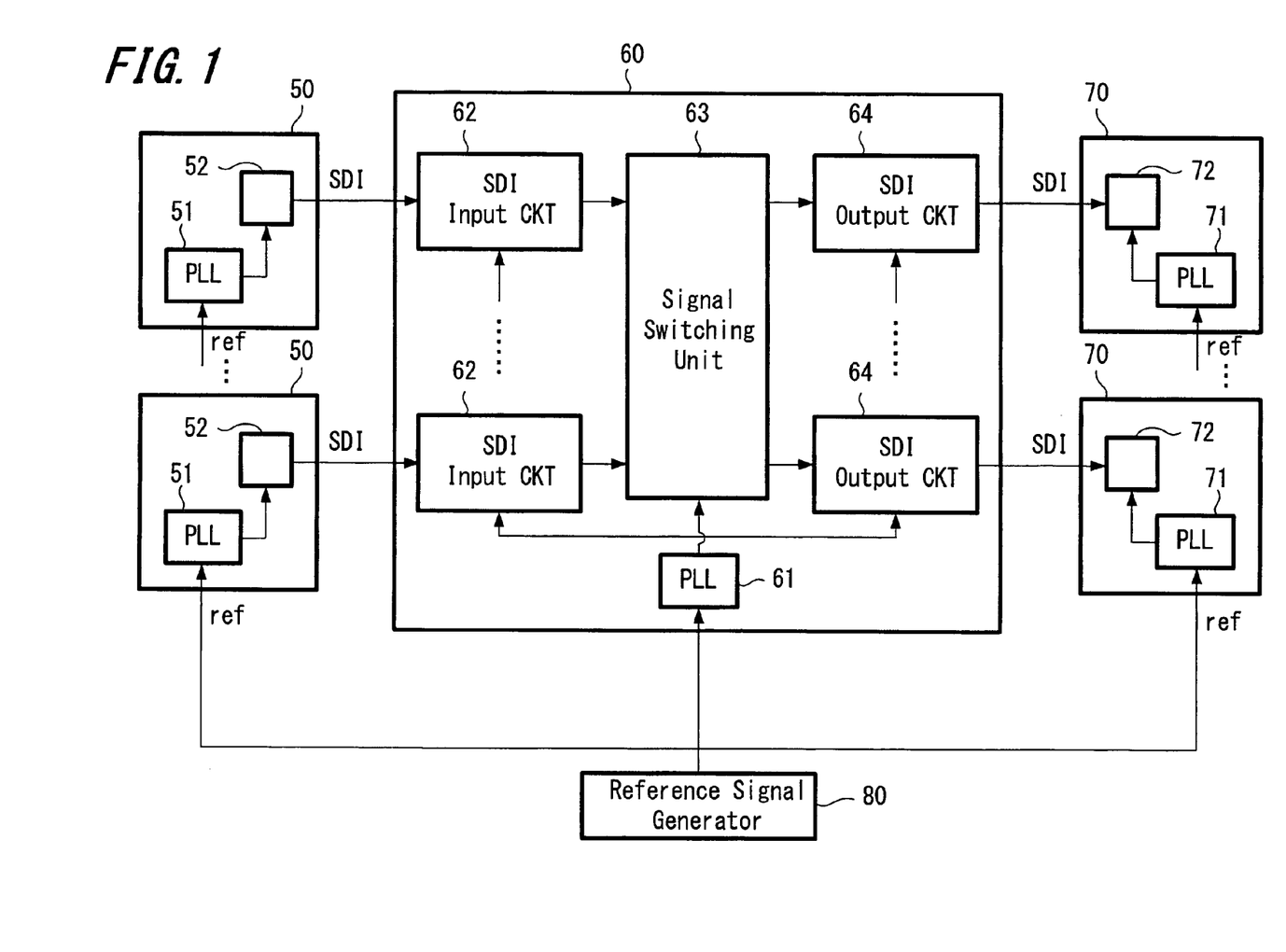
FIG. 1 is a block diagram showing an example of a video synchronization system.

In the field of video production or the like, it has been typically practiced to build a video synchronization system in which a plurality of video apparatuses are synchronized with a reference signal. FIG. 1 is a schematic block diagram exemplarily showing such video synchronization system. An external reference signal ref is supplied to a plurality of video cameras 50, a switcher 60 and a plurality of VTRs 70 from a reference signal generator 80.

The respective video cameras 50 use a clock generated from the external reference signal ref at a PLL 51 as an internal reference clock of the apparatus. Parallel digital video data generated in an image-capturing system and video signal processing system (not illustrated) is converted into a serial digital signal (hereinafter referred to as an SDI signal) of SDI (Serial Digital Interface) format using the internal reference clock in an SDI output circuit 52. The converted SDI signal is output to the switcher 60.

The switcher 60 is a video apparatus for switching the output of video signals input from the plurality of video apparatuses to the respective video apparatuses. The switcher 60 uses the clock generated from the external reference signal ref at a PLL 61 as the internal reference clock of the apparatus. The switcher 60 decodes the SDI signal input from the respective video cameras 50 into the original parallel digital video data using the internal reference clock at respective SDI input circuits 62. The decoded parallel digital video data is switched at a signal switching unit 63 and afterward converted again into the SDI signal at an SDI output circuit 64, and the converted SDI signal is then output to the respective VTRs 70.

The VTRs 70 decode the SDI signal input from the switcher 60 into the original parallel digital video data at SDI input circuits 72 using the clock generated from the external reference signal ref at a PLL 71 as the internal reference clock of the apparatus. Then, the decoded parallel digital video data is recorded on a video tape in a recording video signal processing system (not illustrated).

In the case where a video signal (an SDI signal in FIG. 1) sent to and received from the video apparatuses carries a large amount of jitter/wander, video data may be affected, because such jitter/wander is not sufficiently absorbed in the video apparatuses (the switcher 60 and VTRs 70 in FIG. 1) inputting the video signal in such video synchronization system.

Accordingly, system debugging using a dedicated instrument for measuring the jitter/wander has been carried out in the past. However, there are cases having a difficulty in identifying the cause of the jitter/wander due to reasons listed in the following [1] through [4]. As a result, there occurs a delay in countermeasure, which is disadvantageous for the user.

[1] Since the respective video apparatuses operate in synchronization with the internal reference clock of the apparatus generated from the external reference signal ref at respective PLLs as shown in FIG. 1, jitter/wander may be caused by variations of reference clock in each device.

[2] Although there is the rated value in SMPTE with respect to an allowable amount of jitter, there is no rated value with respect to wander and therefore a tolerance for the wander in a video apparatus may be unclear.

[3] It is difficult to measure jitter/wander occurring suddenly or less frequently (for example, the jitter/wander caused by a temporary power-supply noise), because the jitter/wander may not occur while the measurement is carried out using the measuring instrument.

[4] A phenomenon similar to large jitter/wander may occur when the reference signal is not supplied (reference failure) due to a cause such as a contact failure of cables connecting the reference signal generator and the video apparatus.

Here, such an optical transmission communication apparatus, for example, as described below has been proposed (refer to Japanese Unexamined Patent Application Publication No. 2003-32212). In the optical transmission communication apparatus, a clock generated in a DMUX portion for demultiplexing a transmission signal input from the outside is used as a writing clock for writing the demultiplexed data in a buffer memory. The clock generated by smoothing out the clock generated in the DMUX portion is used as the reading clock for reading the data from the buffer memory. Further, only the case having a phase close to or distant from the timing writing to and reading from the buffer memory is counted up. Then, as a result of observation for a long time, whether the wander has occurred is determined based on whether a ratio of plus (+) side count value counted on the phase having the read timing close to the write timing to minus (−) side count value counted on the phase having the read timing distant from the write timing is equal.

However, in the case where the jitter has occurred, the ratio of the plus (+) side count value to the minus (−) side count value may be substantially equal in a comparison between the plus (+) side count value and the minus (−) side count value as described in the above Patent Document. Therefore, it may be difficult to determine whether the jitter has occurred.

Further, the optical transmission communication apparatus described in the above Japanese Unexamined Patent Application Publication No. 2003-32212 may be not included in a video synchronization system and not operated in synchronization with the external reference signal.

SUMMARY OF THE INVENTION

It is desirable to provide a video apparatus that processes an input video signal in synchronization with an external reference signal (more specifically, a video apparatus capable of being included in a video synchronization system), in which an amount of jitter/wander of the input video signal can be measured readily and regularly.

According to an embodiment of the present invention, there is provided a video apparatus for processing an input video signal in synchronization with an external reference signal. The video apparatus includes a phase compensating FIFO memory and a measuring device.

The phase compensating FIFO memory is configured such that an input video signal is written in synchronization with clock demodulated from the input video signal and the video signal is read in synchronization with the internal reference clock of the apparatus generated from the external reference signal.

The measuring device is configured to measure an amount of jitter/wander of the input video signal based on a calculation of a difference between data volume of the video signal obtained in the FIFO memory and a predetermined reference volume.

According to another embodiment of the present invention, there is provided a method of measuring jitter/wander of an input video signal in a video apparatus for processing the input video signal in synchronization with an external reference signal. The method includes the steps of:

writing the input video signal in a FIFO memory in synchronization with a clock demodulated from the input video signal and reading the video signal from the FIFO memory in synchronization with an internal reference clock of the apparatus generated from the external reference signal; and measuring an amount of jitter/wander of the input video signal based on a calculation of a difference between data volume of the video signal obtained in the FIFO memory and a predetermined reference volume.

According to the embodiments of the present invention, it is possible to obtain the data volume of the video signal presently stored in the phase compensation FIFO memory that uses the clock demodulated from the input video signal as the writing clock and the internal reference clock of the apparatus generated from the external reference signal as the reading clock. Accordingly, the amount of jitter/wander of the input video signal is measured based on the calculation of the difference between the obtained data volume and the predetermined reference volume.

According to the embodiments of the present invention, relative amount of jitter/wander between the video apparatus on the output side of the video signal and the video apparatus on the input side thereof can be measured readily and regularly from the difference between the data volume in the phase compensation FIFO memory and the predetermined reference volume.

According to the embodiments of the present invention, the relative amount of jitter/wander between the video apparatus on the output side of the video signal and the video apparatus on the input side thereof can be measured readily and regularly.

DESCRIPTION OF THE PREFERRED EMBODIMENTS

Figure 2:
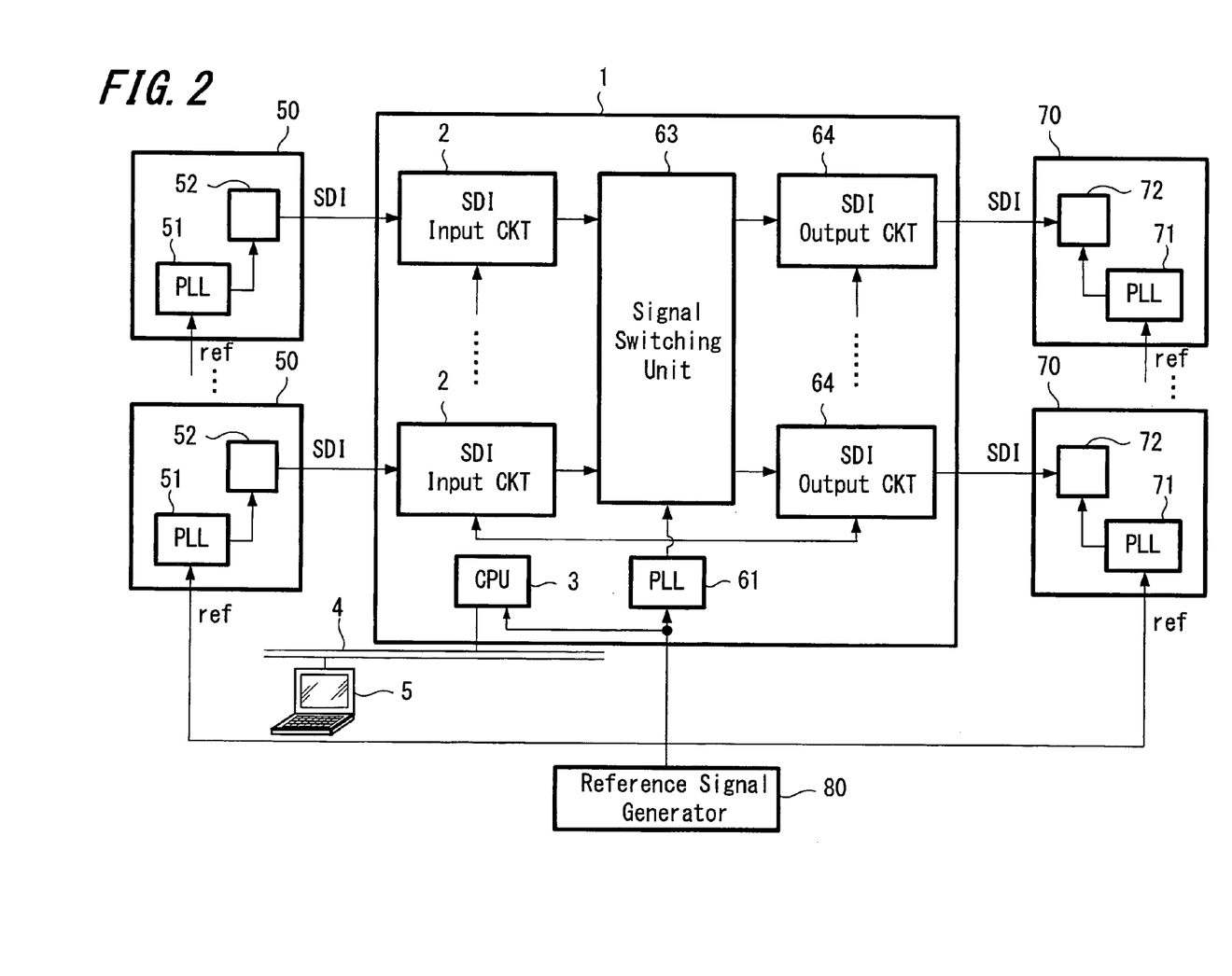
FIG. 2 is a block diagram showing a video synchronization system including a switcher to which an embodiment of the present invention is applied.

Hereinafter, embodiments of the present invention are specifically explained with reference to the accompanied drawings. FIG. 2 is a schematic diagram showing an outline of a video synchronization system including a switcher to which an embodiment of the present invention is applied, and in this figure, the same reference numerals are given to parts corresponding to those in FIG. 1. An external reference signal ref is supplied to a plurality of video cameras 50, a switcher 1 and VTRs 70 from a reference signal generator 80.

The respective video cameras 50 use a clock generated from the external reference signal ref at a PLL 51 as an internal reference clock of the apparatus. Parallel digital video data generated in the image-capturing system and video signal processing system (not illustrated) is converted into an SDI signal using the internal reference clock in an SDI output circuit 52. The converted SDI signal is output to the switcher 1.

The switcher 1 is a video apparatus for switching the output of video signals input from the plurality of video apparatuses to respective video apparatuses. The switcher 1 uses the clock generated from the external reference signal ref at a PLL 61 as the internal reference clock of the apparatus. Then, the switcher 1 decodes the SDI signal input from the respective video cameras 50 into the original parallel digital video data using the internal reference clock at respective SDI input circuits 2. The decoded parallel digital video data is switched at a signal switching unit 63 and afterward converted again into the SDI signal at an SDI output circuit 64, and the converted SDI signal is then output to each VTR 70.

A CPU 3 is configured to control each unit in the switcher 1 and connected to a LAN (Local Area Network) 4 through a network interface (not illustrated). A maintenance terminal 5 formed of a personal computer is also connected to the LAN 4.

The VTRs 70 decode the SDI signal input from the switcher 1 into the original parallel digital video data at SDI input circuits 72 using the clock generated from the external reference signal ref by the PLL 71 as the internal reference clock of the apparatus. Then, the decoded parallel digital video data is recorded on a video tape in a recording video signal processing system (not illustrated).

Figure 3:
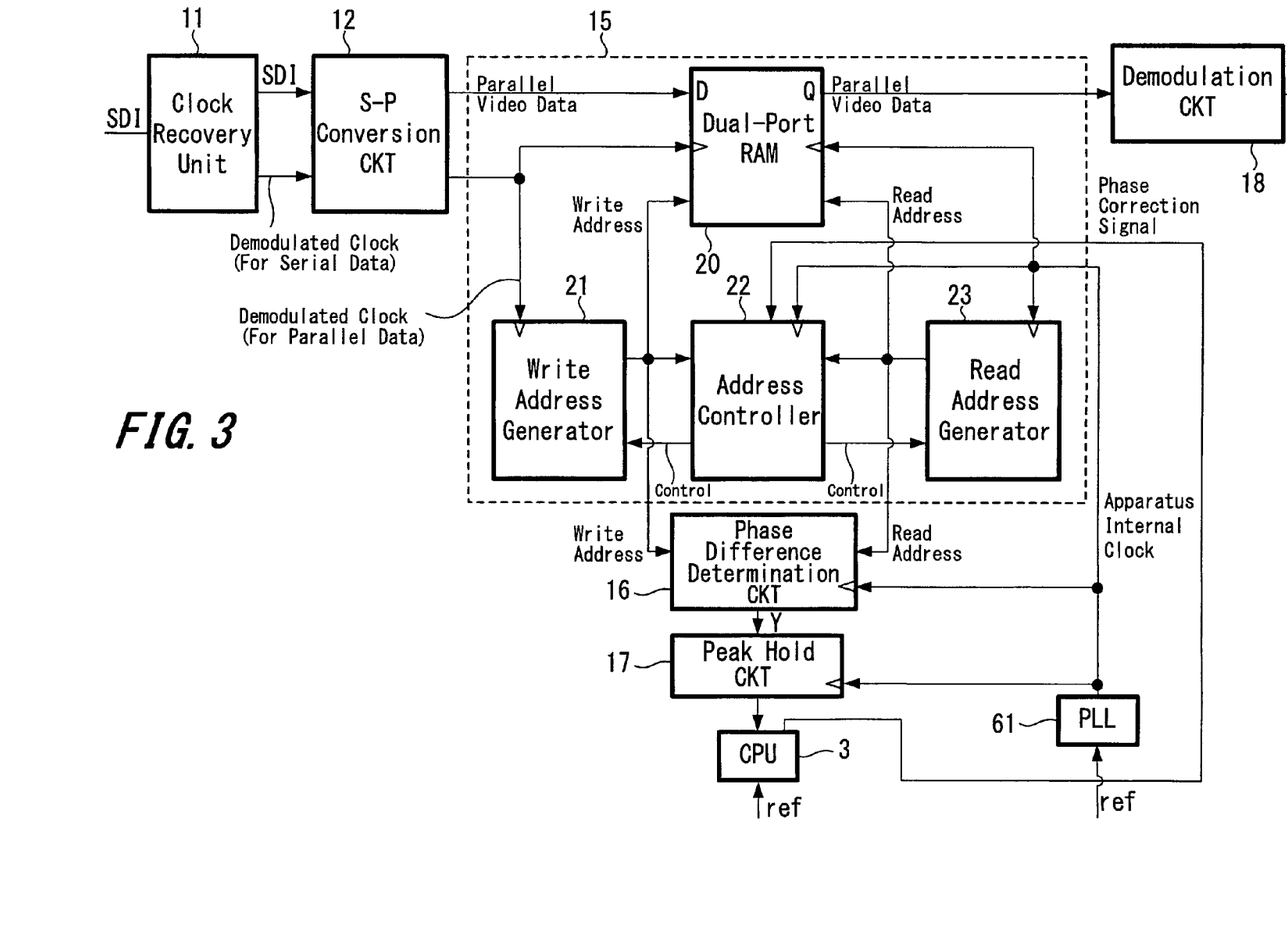
FIG. 3 is a block diagram showing a configuration of an SDI input circuit of the switcher shown in FIG. 2.

FIG. 3 is a block diagram showing a configuration of each SDI input circuit 2 in the switcher 1 together with the CPU 3 and the PLL 61. The SDI input circuit 2 includes a clock recovery unit 11, a S-P (Serial-Parallel) conversion circuit 12, a phase compensation FIFO 15, a phase difference determination circuit 16, a peak hold circuit 17, and a demodulation circuit 18.

The clock recovery unit 11 demodulates serial data clock (clock of 270 Mbps for an SD-SDI signal, and clock of 1.485 Gbps or 1/1.001 thereof for an HD-SDI signal) from the SDI signal input from the video camera 50 and sends the demodulated clock together with the SDI signal to the S-P conversion circuit 12.

The S-P conversion circuit 12 performs parallel conversion on the SDI signal supplied from the clock recovery unit 11 and sends the converted signal to the phase compensation FIFO 15. Further, the S-P conversion circuit 12 converts the demodulated clock supplied from the clock recovery unit 11 into a frequency of parallel data and sends the converted clock to the phase compensation FIFO 15.

The phase compensation FIFO 15 is a twelve-staged FIFO memory configured to absorb the relative jitter/wander between the video apparatus (the video cameras 50 in FIG. 2) on the output side of the video signal and the switcher 1 and includes a dual-port RAM 20, a write address generator 21, an address controller 22, and a read address generator 23.

The parallel digital video data from the S-P conversion circuit 12 is input to a port D of the dual-port RAM 20.

The write address generator 21 supplies a write address (a value specifying one of the above-described twelve stages) to the dual-port RAM 20 in synchronization with the demodulated clock generated in the S-P conversion circuit 12 under the control of the address controller 22.

The dual-port RAM 20 writes the parallel digital video data input to the port D into an area of the above specified write address in synchronization with the demodulated clock generated in the S-P conversion circuit 12.

In addition, the internal reference clock of the apparatus is supplied to the phase compensation FIFO 15 from the PLL 61. The read address generator 23 supplies a read address (a value specifying one of the above-described twelve stages) to the dual-port RAM 20 in synchronization with the reference clock under the control of the address controller 22.

The dual-port RAM 20 outputs the parallel digital video data, which is read from the area of the above-described read address in synchronization with the reference clock, from another port Q to the demodulation circuit 18. The demodulation circuit 18 converts the data supplied from the port Q into NRZ (Non Return to Zero), then descrambles and decodes the data to the original parallel digital video data, and supplies the decoded parallel digital video data to the signal switching unit (not illustrated) in the switcher 1.

Further, the CPU 3 supplies a phase correction signal to the address controller 22 based on the external reference signal ref for each frame at a timing of video switching point predetermined by the SMPTE during a vertical blanking period. The phase correction signal is a signal to correct the phase of the phase compensation FIFO 15 (such that the write address and read address of the dual-port RAM 20 have opposing addresses in the twelve-staged FIFO memory).

The address controller 22 controls the write address generator 21 and the read address generator 23 for each frame at the timing that the phase correction signal is given thereto so that the write address and the read address become the opposing addresses in the twelve-staged FIFO memory (for example, when the write address indicates the first stage, a value specifying the seventh stage is set as the read address).

Figure 4:
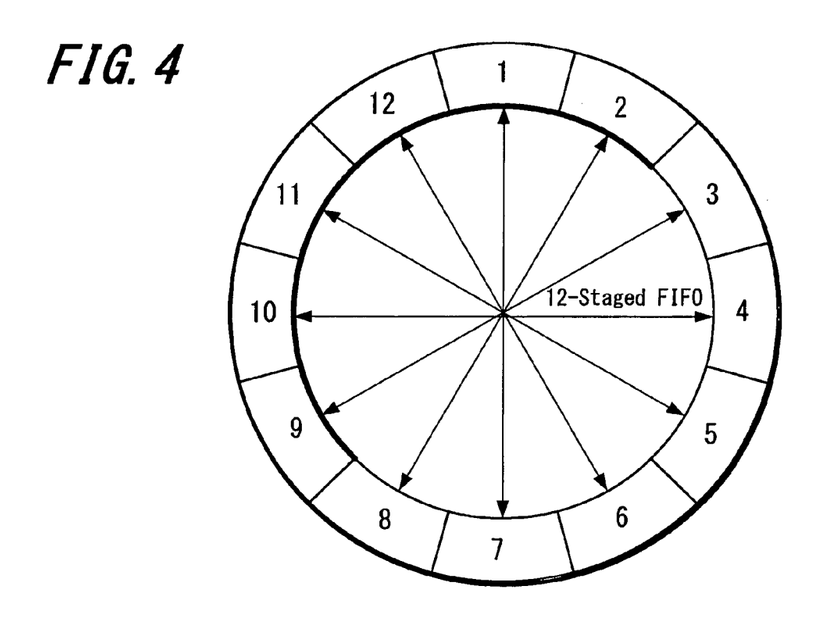
FIG. 4 is a diagram conceptually showing phase compensation in a phase compensation FIFO shown in FIG. 3.

FIG. 4 is a diagram showing conceptually the phase compensation in the phase compensation FIFO 15. At each frame, the write address and the read address are set to be the opposing addresses in the twelve-staged FIFO memory at the timing that the above-described phase correction signal is supplied to the controller. For example, the value specifying the seventh stage is set as the read address when the write address indicates the first stage. Then, the parallel digital video data is written sequentially in the first stage, second stage, . . . while using the clock demodulated from the input SDI signal as the writing clock. Further, the parallel digital video data is read sequentially from the seventh stage, eighth stage, . . . while using the internal reference clock of the apparatus as the reading clock.

If relative jitter/wander is present between the video apparatus (the video cameras 50 in FIG. 2) on the output side of the video signal and the switcher 1, the difference between the read address and the write address (in other words, the data volume in the FIFO memory) becomes larger or smaller than a center value 6. However, such relative jitter/wander can be absorbed as long as the read address and the write address are in the range of not being the same.

The internal reference clock of the apparatus is also supplied to the phase difference determination circuit 16 and peak hold circuit 17 from the PLL 61 as shown in FIG. 3. The phase difference determination circuit 16 regularly obtains the difference X between the write address from the write address generator 21 and the read address from the read address generator 23 (in other words, the data volume stored in the FIFO memory) and calculates an absolute value Y=|6−X| of the difference between the obtained data volume X and the center value 6.

The peak hold circuit 17 is the circuit that peak-holds the maximum value of the absolute value Y calculated at the phase difference determination circuit 16. The peak hold circuit 17 is configured to optionally set a hold time and the peak hold value can be cleared at an optional timing upon the control of the CPU 3.

A signal indicating the peak-held absolute value Y is supplied to the CPU 3 from the peak hold circuit 17 in the respective SDI input circuits 2. The CPU 3 converts the absolute value Y supplied from the respective peak hold circuits 17 into 4-bit values having the amount of jitter/wander classified into five stages.

Figure 5:
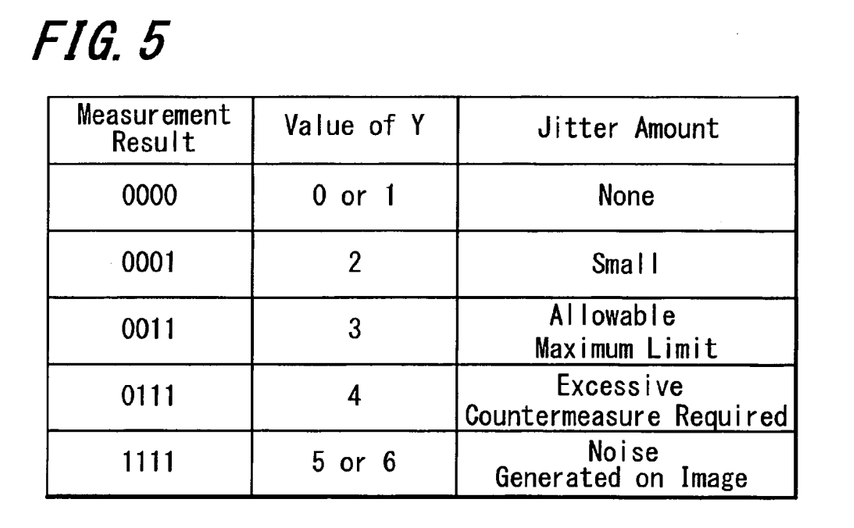
FIG. 5 is a diagram showing contents of the process for converting an absolute value Y by CPU.

Specifically, as shown in FIG. 5, in the case where the absolute value Y is 0 or 1, the CPU 3 converts the absolute value Y into a binary number of 0000 indicating such a measurement result that there occurs no jitter/wander. In the case where the absolute value Y is 2, the absolute value Y is converted into a value 0001 indicating such measurement result that the amount of jitter/wander is small. In the case where the absolute value Y is 3, the absolute value Y is converted into a value 0011 indicating such measurement result that the amount of jitter/wander is allowable maximum limit. In the case where the absolute value Y is 4, the absolute value Y is converted into a value 0111 indicating such measurement result that there is an excessive amount of jitter/wander that may require a countermeasure. In the case where the absolute value Y is either 5 or 6, the absolute value Y is converted into a value 1111 indicating such measurement result that the amount of jitter/wander has reached a level at which noise may be generated in an image displayed.

The maintenance terminal 5 shown in FIG. 2 carries out operations for the maintenance of the switcher 1, one of which is the operation of specifying any video camera 50 among the plurality of video cameras 50 and causing the measurement result of the relative jitter/wander between the specified video camera 50 and the switcher 1 to be displayed on a screen. Upon such operation, the measurement result of the jitter/wander is requested to the CPU 3 in the switcher 1 from the maintenance terminal 5 through the LAN 4.

Upon receiving such request, the CPU 3 supplies the maintenance terminal 5 with a four-bit value in which the absolute value Y from the peak hold circuit 17 in the SDI input circuit 2 corresponding to the specified video camera 50 is converted as shown in FIG. 5.

Figure 6A:
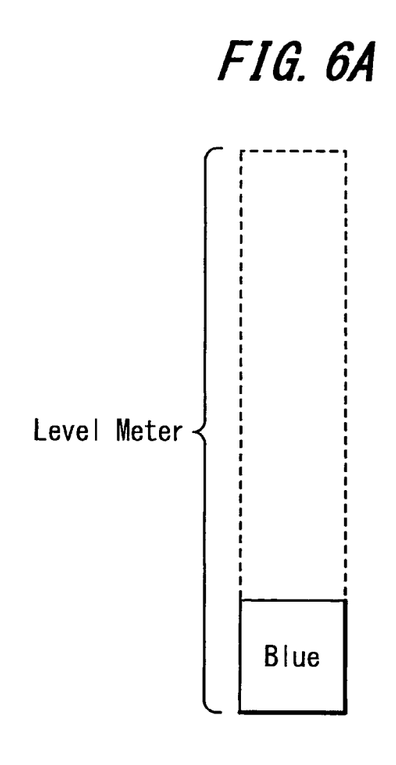
FIGS. 6A to 6E are diagrams showing examples of displaying measurement results of jitter/wander on a maintenance terminal.
Figure 6B:
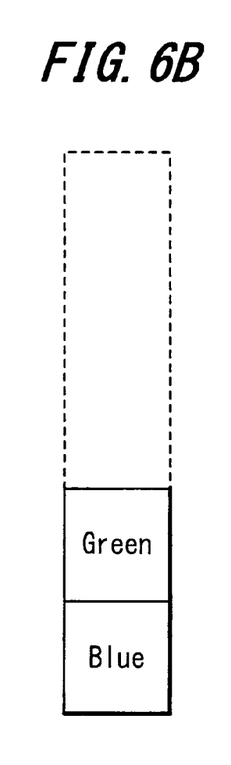
Figure 6C:
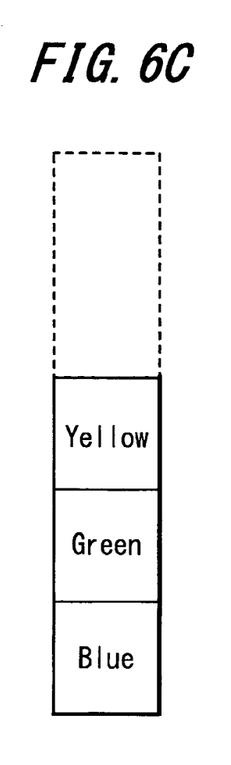
Figure 6D:
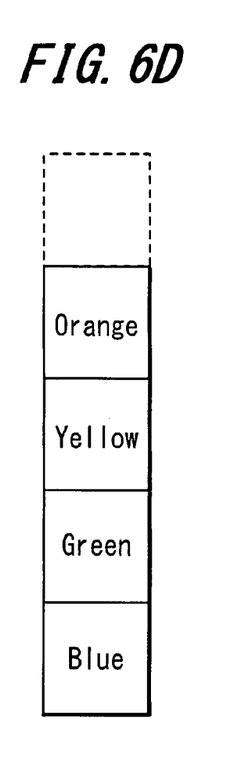
Figure 6E:
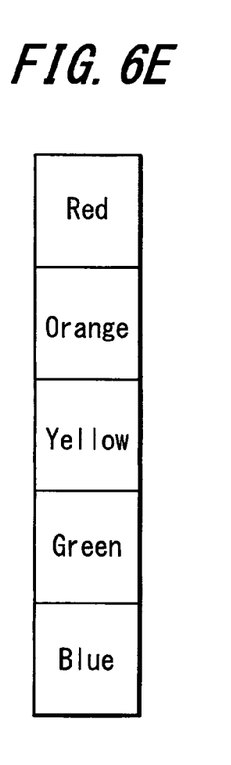

In the maintenance terminal 5, the measurement result of the jitter/wander is displayed on the screen using a level meter based on the four-bit value that is sent back. More specifically, if the value is 0000, it is displayed with blue that there occurs no jitter/wander as shown in FIG. 6A. If the value is 0001, the display of green indicating a small amount of jitter/wander is added as shown in FIG. 6B. If the value is 0011, the display of yellow indicating that the amount of jitter/wander is allowable maximum limit is added further as shown in FIG. 6C. If the value is 0111, the display of orange indicating that the countermeasure may be required since the amount of jitter/wander is excessive is added further as shown in FIG. 6D. If the value is 1111, the display of red indicating that the amount of jitter/wander has reached the level at which the noise is generated on the displayed image is added further as shown in FIG. 6E.

In addition, the maintenance terminal 5 performs an operation of specifying any SDI input circuit 2, sets the hold time of the peak hold circuit 17 in the specified SDI input circuit 2 and clears the peak hold value of the peak hold circuit 17. With such operations, the maintenance terminal 5 requests the CPU 3 in the switcher 1 to set the hold time and clear the peak hold value through the LAN 4.

Upon receiving such request, the CPU 3 controls the peak hold circuit 17 in the specified SDI input circuit 2 to set the hold time and clear the peak hold value.

According to the above-described switcher 1, the data volume presently stored in the phase compensation FIFO 15 is obtained using the clock demodulated from the input video signal (SDI signal) as the writing clock and the internal reference clock of the apparatus generated from the external reference signal ref as the reading clock. Hence, the amount of jitter/wander of the input video signal is measured based on the calculation of the difference between the obtained data volume and the reference volume (which is 6 representing the center value).

According to an embodiment of the present invention, the relative amount of jitter/wander between the video apparatus (the video cameras 50 in FIG. 2) on the output side of the SDI signal and the switcher 1 can be measured readily and regularly at low cost based on the difference between the data volume in the phase compensation FIFO 15 and the reference volume as described above.

Further, according to an embodiment of the present invention, the maximum value of the calculated difference is peak-held. Therefore, a trace of such maximum value can be obtained as the peak hold value by setting a long hold time and not clearing the peak hold value even in the case where less frequent jitter/wander occurs or unexpected jitter/wander occurs (for example, in the case of the jitter/wander caused from a temporary power-supply noise). Accordingly, the jitter/wander occurring less frequently and the jitter/wander occurring unexpectedly can also be measured.

Further, according to an embodiment of the present invention, the phase of the phase compensation FIFO 15 is corrected periodically for each frame (the read address and write address of the dual-port RAM 20 for each frame are set to opposite addresses in the twelve-staged FIFO memory) as shown in FIG. 4. Therefore, even in the case of a large jitter/wander caused at a certain frame or a phenomenon similar to a large jitter/wander due to such a cause as a reference failure at a certain frame, the relative jitter/wander between the video camera 50 and the switcher 1 can be absorbed at the subsequent frame by eliminating an influence of such large jitter/wander. The reference failure may occur when the reference signal is not supplied because of a contact failure of the cable connecting the reference signal generator 80 to the video camera 50 and the switcher 1 as shown in FIG. 2.

Further, according to an embodiment of the present invention, the phase of the phase compensation FIFO 15 is thus corrected periodically for each frame. Accordingly, the relative jitter/wander between the video camera 50 and the switcher 1 can be absorbed in a case that external reference signals are supplied respectively from separate reference signal generators (specifically, frequencies of the respective external reference signals of the video camera 50 and the switcher 1 are not exactly same) instead of supplying the external reference signal from the common reference signal generator 80 (in FIG. 2) to the video camera 50 and switcher 1.

Furthermore, according to an embodiment of the present invention, the difference between the data volume in the phase compensation FIFO 15 and the reference volume is converted into the value in which the amount of jitter/wander is classified into the plurality of levels as shown in FIG. 5.

Accordingly, a maintenance staff can obtain visually and readily the amount of jitter/wander and whether a countermeasure is required for the amount of jitter/wander in that level from the display on the screen of the maintenance terminal 5 as exemplarily shown in FIG. 6.

It should be noted that the phase of the phase compensation FIFO 15 is corrected for each frame in the above-described embodiment. However, according to another embodiment, operations of setting a cycle of correcting the phase of the phase compensation FIFO 15 and of selecting whether the correction set is executed or not may be performed on the maintenance terminal 5 so that the phase of the phase compensation FIFO 15 is corrected based on the results of such operations.

In addition, the measurement result of the jitter/wander is supplied to the maintenance terminal 5 from the switcher 1, and the operations of setting the hold time at the peak hold circuit 17 and of clearing the peak hold value are also performed on the maintenance terminal 5 in the above-described embodiment. However, as another embodiment, the measurement result of the jitter/wander may be displayed on the screen of an operation panel of the switcher 1 and the operations of setting the hold time at the peak hold circuit 17 and of clearing the peak hold value may be performed on this operation panel.

Further, an embodiment of the present invention is applied to a switcher to which an SDI signal is input as described above, however, an embodiment of the present invention may be applied to a switcher to which a video signal of other format than the SDI (for example, a DVB-ASI signal) is input.

Furthermore, the embodiment of the present invention is applied to a switcher as described above, however, an embodiment of the present invention may be applied to any kind of video apparatus that processes an input video signal in synchronization with an external reference signal.

It should be understood by those skilled in the art that various modifications, combinations, sub-combinations and alterations may occur depending on design requirements and other factors insofar as they are within the scope of the appended claims or the equivalents thereof.

What is claimed is:

1. A video apparatus for processing an input video signal in synchronization with an external reference signal, comprising:
   a phase compensation FIFO memory to which the input video signal is written in synchronization with a clock demodulated from the input video signal and from which the video signal is read in synchronization with an internal reference clock of the apparatus generated from the external reference signal; and
   measuring means for measuring an amount of jitter/wander of the input video signal based on a calculation of a difference between data volume of the video signal obtained in the FIFO memory and a predetermined reference volume,
   wherein the data volume of the video signal obtained in the FIFO memory is obtained using the clock demodulated from the input video signal as a writing clock and the internal reference clock generated from the external reference signal ref as a reading clock,
   wherein a maximum value is obtained as a peak hold value by setting a long hold time and not clearing the peak hold value even in a case where less frequent jitter/wander occurs or unexpected jitter/wander occurs, thereby allowing the jitter/wander occurring less frequently and the jitter/wander occurring unexpectedly to be measured.

2. A video apparatus according to claim 1, wherein the measuring means holds a maximum peak value of the calculated difference.

3. A video apparatus according to claim 1, wherein the measuring means converts the calculated deference into a value in a plurality of classified levels of amount of jitter/wander.

4. A video apparatus according to claim 1, further comprising
reset means for resetting the data volume in the FIFO memory periodically to the predetermined reference volume.

5. A method of measuring jitter/wander of an input video signal in a video apparatus for processing the input video signal in synchronization with an external reference signal, the method comprising the steps of:
writing the input video signal in a FIFO memory in synchronization with a clock demodulated from the input video signal and reading the video signal from the FIFO memory in synchronization with an internal reference clock of the apparatus generated from the external reference signal; and
measuring an amount of the jitter/wander of the input video signal based on a calculation of a difference between data volume of the video signal obtained in the FIFO memory and a predetermined reference volume,
wherein the data volume of the video signal obtained in the FIFO memory is obtained using the clock demodulated from the input video signal as a writing clock and the internal reference clock generated from the external reference signal ref as a reading clock,
wherein a maximum value is obtained as a peak hold value by setting a long hold time and not clearing the peak hold value even in a case where less frequent jitter/wander occurs or unexpected jitter/wander occurs thereby allowing the jitter/wander occurring less frequently and the jitter/wander occurring unexpectedly to be measured.

6. A method of measuring jitter/wander according to claim 5, wherein
a maximum peak value of the calculated difference is held at the measuring step.

7. A method of measuring jitter/wander according to claim 5, wherein
the calculated difference is converted into a value in a plurality of classified levels of amount of jitter/wander at the measuring step.

8. A method of measuring jitter/wander according to claim 5, further comprising the step of:
resetting periodically the data volume in the FIFO memory to the predetermined reference volume.

9. A video apparatus for processing an input video signal in synchronization with an external reference signal, comprising:
a phase compensation FIFO memory to which the input video signal is written in synchronization with a clock demodulated from the input video signal and from which the video signal is read in synchronization with an internal reference clock of the apparatus generated from the external reference signal; and
a measuring device measuring an amount of jitter/wander of the input video signal based on a calculation of a difference between data volume of the video signal obtained in the FIFO memory and a predetermined reference volume,
wherein the data volume of the video signal obtained in the FIFO memory is obtained using the clock demodulated from the input video signal as a writing clock and the internal reference clock generated from the external reference signal ref as a reading clock,
wherein a maximum value is obtained as a peak hold value by setting a long hold time and not clearing the peak hold value even in a case where less frequent jitter/wander occurs or unexpected jitter/wander occurs, thereby allowing the jitter/wander occurring less frequently and the jitter/wander occurring unexpectedly to be measured.

* * * * *